United States Patent [19]
Gen et al.

[11] Patent Number: 4,667,869
[45] Date of Patent: * May 26, 1987

[54] SOLDERING METHODS AND DEVICES

[75] Inventors: Tamar G. Gen, Mountain View; Edward A. Cydzik, San Mateo, both of Calif.

[73] Assignee: Raychem Corporation, Menlo Park, Calif.

[*] Notice: The portion of the term of this patent subsequent to Mar. 19, 2002 has been disclaimed.

[21] Appl. No.: 599,837

[22] Filed: Apr. 13, 1984

Related U.S. Application Data

[63] Continuation-in-part of Ser. No. 308,867, Oct. 5, 1981, Pat. No. 4,505,421.

[51] Int. Cl.$^4$ .................................... B23K 35/36
[52] U.S. Cl. ................... 228/103; 228/224; 148/23
[58] Field of Search ............ 228/223, 224, 103, 56 R, 228/214; 148/23

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,087,238 | 4/1963 | Nottingham . |
| 3,239,125 | 3/1966 | Sherlock . |
| 3,305,625 | 2/1967 | Ellis . |
| 3,316,343 | 4/1967 | Sherlock . |
| 3,396,460 | 8/1968 | Wetmore . |
| 3,396,894 | 8/1968 | Ellis . |
| 3,451,609 | 6/1969 | Gillett . |
| 3,730,782 | 5/1973 | Poliak et al. ................ 148/23 |
| 3,957,382 | 5/1976 | Greuel et al. . |
| 4,090,655 | 5/1978 | Tissot . |
| 4,137,369 | 1/1979 | Chaikin ................ 228/56.5 X |
| 4,207,364 | 6/1980 | Nyberg . |
| 4,228,761 | 10/1980 | Glover et al. . |
| 4,304,959 | 12/1981 | Vidakovits et al. . |
| 4,344,909 | 8/1982 | DeBlauwe . |
| 4,505,421 | 3/1985 | Gen et al. ................ 228/103 X |

FOREIGN PATENT DOCUMENTS

| | | | |
|---|---|---|---|
| 2809461 | of 0000 | Fed. Rep. of Germany . | |
| 62-41478 | of 0000 | Japan . | |
| 54-153293 | of 0000 | Japan . | |
| 53-15243 | 2/1978 | Japan ................ | 228/103 |
| 1014080 | of 0000 | United Kingdom . | |
| 1132334 | of 0000 | United Kingdom . | |
| 1599520 | of 0000 | United Kingdom . | |
| 2081467 | of 0000 | United Kingdom . | |
| 689462 | 3/1953 | United Kingdom ........ | 148/23 |
| 482264 | 6/1976 | U.S.S.R. ................ | 228/103 |

OTHER PUBLICATIONS

"Crayons, Paints, Labels Tell Part Temperature" Welding Design and Fabrication, Dec. 1981, p. 82.
"Transparent Flip Chip for Monitoring Flux Cleaning" IBM Technical Disclosure Bulletin, vol. 18, No. 10, Mar. 1976, p. 3231.
"One-Shot Temperature Indicators"–Assembly Engineering (Dec. 1979, pp. 14–15).

Primary Examiner—Kuang Y. Lin
Attorney, Agent, or Firm—Edith A. Rice; Herbert G. Burkard

[57] ABSTRACT

A heat-recoverable soldering device comprises a heat-recoverable member containing a fusible solder insert, solder flux and a thermochromic composition which undergoes a visible change from a colored to a colorless state at the soldering temperature. Solderable substrates are positioned within the device and heat is applied until the soldering temperature has been reached, as indicated by a color change of the thermochromic composition. The soldering temperature is that temperature which is required to effect a solder joint between the substrates and recovery of the heat-recoverable member. Typically this temperature is at least about 20° C. above the melting temperature of the solder.

8 Claims, 2 Drawing Figures

U.S. Patent    May 26, 1987    4,667,869
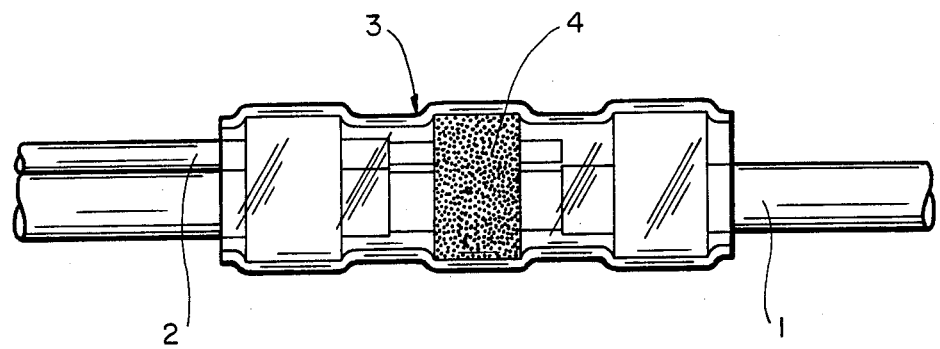
FIG_1
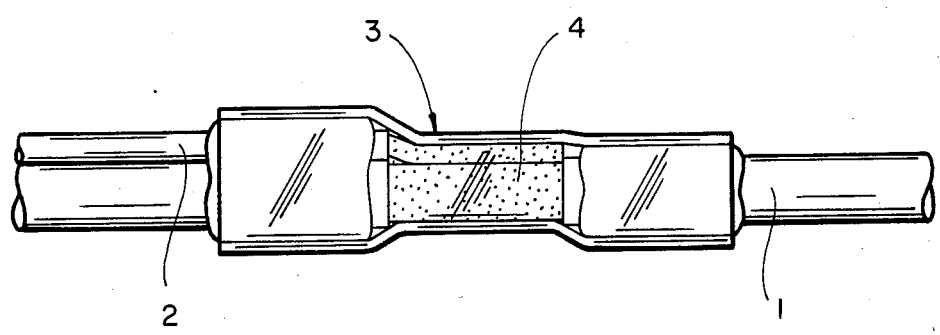
FIG_2

SOLDERING METHODS AND DEVICES

BACKGROUND OF THE INVENTION

This application is a continuation-in-part of application Ser. No. 308,867 filed Oct. 5, 1981, now U.S. Pat. No. 4,505,421, the disclosure of which is incorporated herein by reference.

This invention relates to a heat-recoverable soldering device containing a solder insert, solder flux and a temperature indicating composition, and to a method of soldering using said use of devices.

Heat-recoverable solder devices are known in the art. See, for example, U.S. Pat. Nos. 3,239,125 to Sherlock, 3,305,625 to Ellis, 3,316,343 to Sherlock, 3,396,460 to Wetmore and 3,396,894 to Ellis. Such heat-recoverable devices are generally heat-shrinkable polymeric sleeves having a fusible insert comprising solder. Elongate substrates, such as a pair of wires, are inserted into the sleeve and heat is applied causing the sleeve to shrink into contact with the substrates. The heat also causes the solder to melt and flow around the substrates. Upon cooling, a solid solder joint is formed between the substrates. In general, the soldering temperature is higher than the temperture required to melt the solder which in turn is higher than the that required to shrink the sleeve. Thus, visual observation that the sleeve has completely recovered does not necessarily mean that the temperature necessary for soldering has been reached. There is, therefore, no visible indication during the soldering process that enough heat has been applied. Further, in the event that a soldered joint so formed fails during use, there is no way of subsequently inspecting the joint to determine whether the failure was due to inadequate heating during the soldering process.

This invention provides a direct, positive indication that a solder joint or connection has reached the correct soldering temperature. It provides this indication during the soldering process to indicate when adequate heat has been aplied to effect the solder termination. Further, it provides a continuing indication, after the soldering step has been completed, that adequate heat was applied during soldering and permits visual inspection of the soldered joint to detect improperly formed terminations.

SUMMARY OF THE INVENTION

One aspect of this invention comprises a soldering device comprising a transparent heat-recoverable polymeric member containing a fusible solder insert, solder flux and a thermochromic composition comprising a binder and a temperature indicator, which composition undergoes a visible change from a colored to a colorless state at the soldering temperature.

Another aspect of this invention comprises a method of soldering at least two solderable elongate substrates which comprises:
(a) positioning said substrates within a heat-recoverable soldering device, said device comprising a transparent heat-recoverable polymeric member containing a fusible solder insert, solder flux and a thermochromic composition comprising a binder and a temperature indicator, which composition undergoes a visible change from a colored to a colorless state at the soldering temperature;
(b) heating said device, thereby causing said heat-recoverable member to recover into contact with said substrates; and
(c) continuing to heat said device until said thermochromic composition becomes colorless.

BRIEF DESCRIPTION OF THE DRAWINGS

FIG. 1 is a side view of a typical heat-recoverable device of this invention having an insert of cored solder having a solder flux incorporated therein, said solder insert being coated with a thermochromic composition and two elongate substrates positioned within said device.

FIG. 2 is a side view of the device of FIG. 1 following recovery thereof and change in change in color of the thermochromic composition to colorless.

DETAILED DESCRIPTION OF THE INVENTION

The heat-recoverable soldering devices of this invention include a dimensionally heat-recoverable member. Such heat-recoverable members, and their use in soldering devices is known, for example, see above mentioned U.S. Pat. Nos. 3,239,125, 3,305,625, 3,316,343, 3,396,400 and 3,396,894, the disclosures of which are incorporated herein by reference. The heat-recoverable member is capable of undergoing a change in its dimensional configuration on application of heat. This change in dimensional configuration is usually toward an original shape from which it has previously been deformed, but the term "heat-recoverable", as used herein, also includes a member which, on heating, adopts a new configuration, even if it has not been previously deformed.

The heat-recoverable member generally comprises a heat-shrinkable sleeve made from a polymeric material exhibiting the property of elastic or plastic memory as described, for example, in U.S. Pat. Nos. 2,027,962, 3,086,242, and 3,957,372, the disclosures of which are incorporated herein by reference. The original dimensionally heat-stable form may be a transient form in a continuous process in which, for example, an extruded tube is expanded, while hot, to a dimensionally heat-unstable form but, in other methods of preparation, a preformed dimensionally heat-stable article is deformed to a dimensionally heat-unstable form in a separate stage.

In the production of the heat-recoverable member, the polymeric material is generally cross-linked. One manner of producing a heat-recoverable article comprises shaping the polymeric material into the desired heat-stable form, subsequently cross-linking the polymeric material, heating the article to a temperature above the crystalline melting point, or for amorphous materials the softening point, of the polymer, deforming the article and cooling the article while in the deformed state so that the deformed state of the article is retained. In use, application of heat will cause the article to dimensionally recover from the deformed state to the original heat-stable shape.

Examples of polymers used in the manufacture of heat-recoverable articles include polyolefins, e.g. polyethylene and copolymers of ethylene with ethylenically unsaturated monomers, such as ethylene/ethyl acrylate, ethylene/vinyl acetate copolymers, polyvinyl chloride, elastomers, silicones, polytetrafluoroethylene, polyvinylidene fluoride, polyurethanes, and ionomers. The polymer can be cross-linked either by radiation or chemical means.

The heat-recovery temperature of crystalline polymers is generally a temperature slightly above the crystalline melting temperature. Polymers, such as polyvinyl chloride, which are not crystalline recover at about their glass transition temperature.

The heat-recoverable member used in the soldering device of this invention should be relatively transparent to permit visual observation of the thermochromic composition. The wall thickness of the member should be in the range of from about 0.0005 inch to about 0.05 inch is preferably from about 0.0008 inch to about 0.01 inch.

In the soldering device of this invention, a solder insert is positioned within the heat-recoverable member. This can be done by coating solder onto the surface of the recoverable member. Alternatively, a solder preform of the desired configuration can be produced or then inserted into the heat-recoverable member. The solder is positioned such that when two solderable substrates are positioned within the device and the device is heated, the solder will be forced into intimate contact with the substrates by the recovery of the heat-recoverable member. When the heat-recoverable member is in the form of a heat-shrinkable sleeve, the solder will preferably be in the shape of a ring on the inner surface of the sleeve.

In soldering operations it is conventional to use a solder flux. The flux aids the flow of the solder and/or cleans the surfaces of the substrates to be joined. Various solder flux compositions are known and are commercially available. Widely used as solder fluxes are compositions based on natural rosin. Other fluxes include, for example, inorganic and organic acids. In use, the solder flux melts, flows and covers the substrate surface at a temperature below the melting point of the solder. Thus the particular flux used will depend of the nature of the solder in a given application. Any solder flux can be used in accordance with this invention.

The solder flux can be coated onto the solder by spraying, dipping, brushing or the like, usually before it has been positioned within the heat-recoverable device. Alternatively, the flux can be positioned within the solder, for example, in the form of a core which can be in various configurations, as is well known in the art.

In accordance with this invention a thermochromic composition which changes from a colored to a colorless state at the soldering temperature is applied to the soldering device. By colorless is meant that the thermochromic composition becomes transparent and exhibits little, if any, color. The thermochromic composition comprises a binder and a temperature indicator. Preferably, the thermochromic composition is coated onto the solder. The thermochromic composition can be applied at any convenient stage during manufacture of the soldering device. In embodiments in which the solder flux is coated onto a solder preform, the thermochromic composition can be coated onto the solder prior to or after application of the flux. If applied prior to application of the flux, the binder used in the thermochromic composition should not react adversely with the flux nor be stripped off during the process of applying the flux, for example by dipping the solder preform in the flux. In embodiments in which a cured solder is used, the thermochromic composition is applied directly to the outer surface of the solder. The binder should be capable of withstanding subsequent manufacturing steps, for example, shaping of the solder preform and positioning it within the device. The thermochromic composition, generally dissolved in an appropriate solvent, can be applied to the solder by conventional techniques such as spraying, brushing, dipping or the like.

The solder insert with flux and associated thermochromic composition is positioned within the heat recoverable device. In use the substrates to be soldered are inserted into the device and heat is applied. The device recovers, generally it shrinks, into contact with the substrates, the solder melts, and at the soldering temperature the temperature indicator changes color. Preferably the binder of the thermochromic composition softens and preferably melts and flows and is distributed through the device during the soldering process.

The binder used in the thermochromic composition is one which is capable of withstanding the soldering temperature without degrading, out-gassing or discoloring for the period of time required to effect soldering of the substrate. Binders which can be used in the thermochromic compositions are polymeric or resinous binders, such as, for example, polyvinyl acetate, polyesters, polybutene, ethylenevinyl acetate, co- and terpolymers, polyurethanes, polyethylene glycol, cellulose derivatives such as carboxymethyl cellulose and hydroxypropyl cellulose, polyacrylamides, polyvinyl alcohol, polyvinyl pyrrolidene, waxes such as carnauba wax and the like.

In accordance with this invention, the thermochromic composition changes from a colored to a colorless state when heated to the appropriate soldering temperature. The color change is preferably an irreversible color change as this will provide a permanent means for determining whether the soldered joint was heated to the required temperature during soldering and permit visual inspection of the solder joint.

The thermochromic composition changes color at the soldering temperature. This temperature varies depending on the particular solder used. The soldering temperature is that temperature which is required to effect a solder termination with the particular solder, that is the temperature required to cause the solder to melt, flow and wet the substrates so that on cooling the solder makes a mechanical and electrical bond between the substrates being soldered. The particular solder to be used varies depending on the substrates being joined and the material of the heat-recoverable member. The temperature required to effect the solder termination is above the temperature required to cause recovery of the heat-recoverable member.

Since the soldering temperature varies with the nature of the solder, the temperature indicating component of the thermochromic composition varies depending on the solder used. Generally, the thermochromic composition should undergo a color change in the temperature range of from about 150° C. to about 450° C., preferably from about 200° C. to about 240° C. The temperature of the color change should be in the range from about 20° C. to about 60° C. above the melting point of the solder. In gereral, it should be about 20° C. to about 30° C. above the melting point of low temperature solder and about 30° C. to about 60° C. above the melting point of high temperature solder.

The device is heated to the soldering temperature by any convenient heat source. Use of a hot air gun is preferred. Other sources of heat such as an oven, infrared heater or the like, can be used.

As stated above, the thermochromic composition contains a temperature indicator such that at a the soldering temperature the thermochromic composition becomes colorless. Various temperature indicators can be used, for example, azo dyes such as Pigment Red 53 (an azo dye prepared from 2-nitro-p-toluidine and 2-naphthol, CI 12120), Pigment Red 52, (an azo dye derived from toluenesulfonic acid and 3-hydroxy-2-naphthoic acid, CI 15860) Basic Violet 14 (an axo dye derived from aniline and toluidine, CI 42510), Acid Red 29 (an azo dye derived from aniline and chromotropic acid, CI 16570) and Basic Blue 41, an ayrlamine azo dye, CI 11154, diazo dyes such as Acid Red 73 (a diazo dye derived from p-phenyl-azoaniline and 2-naphthol-6,8-disulfonic acid, CI 27290), and the like.

The amount of temperature indicator incorporated into the thermochromic composition is generally in the range of from about 0.01 to about 5 parts per 100 parts of binder and is preferably from about 0.05 to about 2 parts. The amount added depends on the intensity of the color. Sufficient temperature indicator should be added to provide a thermochromic composition which is clearly visible during the soldering operation. The thermochromic composition can also contain additives including, for example, dispersing aids such as water, alcohol or a surfactant or emulsifier, buffers, such as an acid, stabilizers and the like. The addition of an acid, preferably rosin which may be in the form of flux, modifies the temperature of the color change.

A typical soldering device of this invention and its use in shield termination of coaxial cables is illustrated in FIG. 1. In FIG. 1, a heat-recoverable tubular member, or sleeve, 3, has a solder insert, 4. In this embodiment, the sleeve, 3, is a heat-shrinkable tube of radiation cross-linked ethylene-tetrafluoroethylene copolymer containing fusible thermoplastic inserts toward each end of the tube. Prior to being positioned within the sleeve, 3, the solder insert, 4, was coated with a rosin based flux then a thermochromic composition comprising a polyester binder and Basic Blue 41. The thermochromic composition provided a dark blue color to the solder insert obscuring its inherent grey color.

The unrecovered sleeve, 3, is positioned over a coaxial cable, 1, having a portion of the outer insulation coaxial cable, 1, having a portion of the outer insulation removed to expose the underlying shield and the end region of the ground wire, 2, with the insulation being removed from the end region. The sleeve, 3, is then heated by means of a hot air gun causing it to shrink into contact with the cable and ground wire and to cause the solder to melt and flow. On heating, the thermochromic composition changes color at a temperature above the melting point of the solder from dark blue to colorless. Heating is discontinued at this point. During heating of the sleeve, the thermoplastic inserts melt and seal the sleeve to the cable. The resulting product is shown in FIG. 2. In FIG. 2, sleeve 3, has shrunk into contact with and is sealed to the cable, 1. As the thermochromic composition is now colorless, the grey color of the solder, 4, is visible through the sleeve. The solder has now affected a termination between the shield of 1 and the exposed tip of ground wire, 2.

EXAMPLES 1-14

Thermochromic compositions were prepared by dispersing various dyes in a methylene chloride solution containing a saturated linear polyester resin binder (PE-100—commercially available resin from Goodyear Chemical Company). In some compositions an amount of flux was added to make the composition more acidic. The resins used as the binder are:

Elax 4230 and 4326—
 ethylene-vinyl acetate copolymers commercially available from Du Pont.
VPE 5571, 5824, 5833, 6054 and VAR 4709—
 satuated linear polyesters available under the Trade Mark Vitel from Goodyear.
Estane 5701—
 a polyurethane resin commerically available from BF Goodrich.
The dyes used are:
Garnet Toner—
 an azo dye from toluene sulfonic acid and 3-hydroxy-2-naphthoic acid, Pigment Red 52, CI 15860.
Erthrosin B—
 a xanthene dye classically known as erythrosine, Acid Red 51, CI 145430.
Chromotrope 2R—
 an azo dye aniline and chromotropic acid, Acid Red 29, CI 16570.
Basic Fuchsin—
 an azo dye derived from aniline and toluidine, Basic Violet 14, CI 42510.
Atlasol Spirit Red 52 B—
 Solvent Red 74 (no CI constitution number).
Maxilon Blue—
 an aryl amine azo dye, Basic Blue 41 (no CI constitution number).

The thermochromic composition was coated on a glass plate and a second glass plate was placed on top of the coating. The assembly was then heated and the change of color of the substrate and the temperature of the change was noted. The results are report in Table I.

As shown by the results, various combinations of binder and temperature can be used to provide a thermochromic composition which becomes colorless at soldering temperatures, e.g. about 200°-300° C. depending on the nature of the solder.

TABLE 1

| EX. | BINDER | SOLVENT | FLUX | INDICATOR | % CLEAR OF T° C. | % DISCOLORATION AT T° C. |
|---|---|---|---|---|---|---|
| 1 | Elvax 4230 | CH$_2$Cl$_2$ | — | Garnet Toner and Erythrosin | 50% at 255° C. | 50% at 300° C. |
| 2 | VPE 5824 | " | — | Garnet Toner | 50% at 300° C. | |
| 3 | VPE 5824 | " | — | Garnet Toner and Erythrosin | 50% at 300° C. | |
| 4 | VPE 6054 | " | — | Garnet Toner | 25% at 290° C. | 25% at 300° C. |
| 5 | VPE 5571 | " | — | Garnet Toner | | |
| 6 | PVE 5833 | " | — | Garnet Toner | 25% at 300° C. | |
| 7 | VAR 4709 | " | — | Garnet Toner | 25% at 295° C. | |
| 8 | Polyvinyl Acetate | " | — | Garnet Toner | — | 25% at 180-300° C. |
| 9 | VPE 5824 | " | — | Garnet Toner plus Titanium dioxide | 25% at 210° C. | |
| 10 | VAR 4709 | " | 16% | Garnet Toner | 90% at 290° C. | |

TABLE 1-continued

| EX. | BINDER | SOLVENT | FLUX | INDICATOR | % CLEAR OF T° C. | % DISCOLORATION AT T° C. |
|---|---|---|---|---|---|---|
| 11 | VAR 4709 | " | 33% | Garnet Toner | 98% at 300° C. | |
| 12 | VAR 4709 | " | 33% | Erythrosin B | 96% at 300° C. | |
| 13 | VPE 5833 | " | 33% | Erythrosin B | 98% at 270° C. | |
| 14 | VPE 5833 | " | 33% | Basic Fuchsin | 95% at 250° C. | 50% dark spots at 295° C. |
| 15 | VPE 4583 | " | 33% | Erythrosin B | 98% at 260° C. | |
| 16 | VPE 4583 | " | 33% | Chromotrope 2R | | 50% black at 290° C. |
| 17 | VPE 4583 | " | 33% | Basic Fuchsin | 90% at 255° C. | 50% black at 280° C. |
| 18 | Polyvinyl Acetate | " | 33% | Erythrosin B | 95% at 240° C. | 50% dark areas at 295° C. |
| 19 | Polyvinyl Acetate | " | 33% | Chromotrope 2R | 75% clear at 290° C. | 25% dark areas at 245° C. |
| 20 | Polyvinyl Acetate | " | 33% | Basic Fuchsin | 90% at 265° C. | 50% dark areas at 280° C. |
| 21 | Estane 5701 | " | 33% | Erythrosin B | 95% at 260° C. | |
| 22 | Estane 5701 | " | 33% | Chromotrope 2R | 50% at 280° C. | 50% dark areas at 290° C. |
| 23 | Estane 5701 | " | 33% | Basic Fuchsin | 50% at 260° C. | 75% dark areas at 295° C. |
| 24 | Elvax 4326 | " | 33% | Erythrosin B | 90% at 290° C. | 50% dark areas at 260° C. |
| 25 | Elvax 4326 | " | 33% | Chromotrope 2R | 75% at 290° C. | 25% dark areas at 290° C. |
| 26 | Elvax 4326 | " | 33% | Basic Fuchsin | 50% at 250° C. | 75% at 300° C. |
| 27 | VPE 6054 | — | — | Atlasol Spirit Red 52B | 100% at 280° C. | 100% at 310° C. |
| 28 | VPE 6054 | " | — | Maxilon Blue (5%) | 75% at 200° C. | 50% at 230° C. |
| 29 | VPE 6054 | " | — | Maxilon Blue (20%) | 95% at 230° C. | 75% at 350° C. |

While the invention has been described herein in accordance with certain preferred embodiments thereof, many modifications and changes will be apparent to those skilled in the art. Accordingly, it is intended by the appended claims to cover all such modifications and changes as fall within the true spirit and scope of the invention.

What is claimed is:

1. A soldering device comprising a transparent heat-recoverable polymeric member containing a fusible solder insert, solder flux, and a thermochromic composition comprising a binder and a temperature indicator, which composition undergoes a visible irreversible change from a colored to a colorless state at the soldering temperature without degradation, gassing or discoloration of said binder.

2. A device in accordance with claim 1, wherein said heat-recoverable member is of cross-linked polymeric material.

3. A device in accordance with claim 1, wherein said solder is in the form of a ring on the inner surface of said sleeve.

4. A device in accordance with claim 1, wherein said thermochromic composition comprises a polyester binder and a temperature indicator.

5. A device in accordance with claim 4, wherein said temperature indicator is an azo dye.

6. A composition in accordance with claim 1, wherein said temperature indicator is a xanthene dye.

7. A device in accordance with claim 1, wherein said binder is selected from the group consisting of polyvinyl acetate, polyesters, polybutene, ethylene-vinyl acetate co- and terpolymers, polyurethanes, polyethylene glycol, cellulose derivatives, polyacrylamides, polyvinyl alcohol, polyvinyl pyrrolidine and waxes.

8. A method of soldering at least two solderable elongate substrates which comprises:
(a) positioning said substrates within a heat-recoverable soldering device, said device comprising a transparent heat-recoverable polymeric member containing a fusible solder insert, solder flux, and a thermochromic composition comprising a binder and a temperature indicator, which composition undergoes a visible irreversible change from a colored to a colorless state at the soldering temperature without degradation, gassing or discoloration of said binder;
(b) heating said device, thereby causing said heat-recoverable member to recover into contact with said substrates; and
(c) continuing to heat said device until said thermochromic composition becomes colorless.

* * * * *